United States Patent
Racape et al.

(10) Patent No.: US 12,166,972 B2
(45) Date of Patent: Dec. 10, 2024

(54) INTRA PREDICTION MODE EXTENSION

(71) Applicant: INTERDIGITAL MADISON PATENT HOLDINGS, SAS, Paris (FR)

(72) Inventors: Fabien Racape, San Francisco, CA (US); Gagan Rath, Bhubaneswar (IN); Fabrice Urban, Thorigne Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/517,484

(22) Filed: Nov. 22, 2023

(65) Prior Publication Data

US 2024/0163423 A1    May 16, 2024

Related U.S. Application Data

(63) Continuation of application No. 17/430,435, filed as application No. PCT/US2020/017657 on Feb. 11, 2020, now Pat. No. 11,870,975.

(30) Foreign Application Priority Data

Feb. 13, 2019   (EP) ..................... 19305177

(51) Int. Cl.
*H04N 19/105*    (2014.01)
*H04N 19/159*    (2014.01)
(Continued)

(52) U.S. Cl.
CPC ......... *H04N 19/105* (2014.11); *H04N 19/159* (2014.11); *H04N 19/176* (2014.11);
(Continued)

(58) Field of Classification Search
CPC .. H04N 19/105; H04N 19/159; H04N 19/176; H04N 19/46; H04N 19/70; H04N 19/82
(Continued)

(56) References Cited

U.S. PATENT DOCUMENTS

| 10,045,027 B2 | 8/2018 | Oh et al. |
| 2018/0184082 A1 | 6/2018 | Yoo et al. |

(Continued)

FOREIGN PATENT DOCUMENTS

| CN | 103168472 | 6/2013 |
| CN | 104702950 | 6/2015 |

(Continued)

OTHER PUBLICATIONS

Yoon et al., Most Frequent Mode for Intra-Mode Coding in Video Coding, Electronics Letters, Feb. 21, 2019, vol. 55, No. 4, pp. 188-190—*—cited in parent application.
(Continued)

*Primary Examiner* — Allen C Wong
(74) *Attorney, Agent, or Firm* — Ronald Kolczynski

(57) ABSTRACT

A method and apparatus for performing intra prediction for encoding or decoding adds multiple prediction modes to those of prior intra prediction schemes. A horizontal mode, a vertical mode, and a diagonal mode are added. Reference pixels for each of the added modes can come from multiple pixel positions away from a block to be encoded or decoded. Reference pixels to the left and above a block are reconstructed from those already coded. Reference pixels from right of, and below, a block are estimated or extrapolated and can be based on other pixels around the block. An index can be sent in a bitstream indicating which prediction was used.

20 Claims, 15 Drawing Sheets

(51) Int. Cl.
*H04N 19/176* (2014.01)
*H04N 19/46* (2014.01)
*H04N 19/70* (2014.01)
*H04N 19/82* (2014.01)

(52) U.S. Cl.
CPC ............ *H04N 19/46* (2014.11); *H04N 19/70* (2014.11); *H04N 19/82* (2014.11)

(58) Field of Classification Search
USPC .................................................... 375/240.02
See application file for complete search history.

(56) References Cited

U.S. PATENT DOCUMENTS

2019/0356913 A1* 11/2019 Lim .................. H04N 19/107
2020/0366930 A1* 11/2020 Lee .................. H04N 19/593
2020/0396483 A1* 12/2020 Heo ................... H04N 19/11

FOREIGN PATENT DOCUMENTS

EP         3410721        12/2018
KR      20140124443       10/2014

OTHER PUBLICATIONS

Kotra et al., CE3 6.6.1: A Simple 6-MPM List Construction with Truncated Binary Coding for Non-MPM Signaling, Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0222-v2—*—cited in parent application.

Panusopone et al, Unequal Weight Planar Prediction and Constrained PDPC, 5. JVET Meeting; Dec. 1, 2017-Jan. 20, 2017; Geneva; (The Joint Video Exploration Team of ISO/IEC JTC1/SC29/WG11 and ITU-T SG.16); URL: http://phenix.int-evry.fr/jvet/,, No. JVET-E0068,Jan. 5, 2017 (Jan. 5, 2017)—*—cited in parent application.

Van Der Auwera et al, Description of Core Experiment 3 (CE3): Intra Prediction and Mode Coding, Joint Video Experts Team (JVET) of ITU-T SG 16 WP 3 and ISO/IEC JTC 1/SC 29/WG 11, Document JVET-J1023_r2, 10th Meeting: San Diego, California, Apr. 10, 2018, 49 pages—*—cited in parent application.

Rivaz et al., Bitstream & Decoding Process Specification, 2018, The Alliance for Open Media, pp. 1-681—*—cited in parent application.

De-Luxan-Hernandez et al., Fast Line-Based Intra Prediction for Video Coding, 2018 IEEE International Symposium on Multimedia (ISM)—*—cited in parent application.

Van Der Auwera, et al., Description of Core Experiment 3: Intra Prediction and Mode Coding, Joint Video Experts Team (JVET) of ITU-T SG WP 3 and ISO/IEC JTC 1/SC 29/WG 11, 11th Meeting: Ljubljana, SI, Jul. 10-18, 2018, Document, JVET-K1023-v3—*—cited in parent application.

* cited by examiner

INTRA PREDICTION MODE EXTENSION

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps for determining an extended intra prediction mode to be used to encode a block of video data; predicting a target pixel of the block of video data as a function of one or more pixels neighboring the block using said determined extended intra prediction mode, wherein said predicting comprises: horizontally predicting said target pixel using a reference pixel of a left neighboring row and a reference pixel above and to the right of the block, or vertically predicting said target pixel using a reference pixel of an above neighboring row and a reference pixel left and below the block, or diagonally predicting said target pixel using reference pixels either above the block and above right of the block or left of the block and below left of the block; and, encoding the block of video of video data using the prediction.

According to a second aspect, there is provided a method. The method comprises steps for determining an extended intra prediction mode to be used to decode a block of video data; predicting a target pixel of the block of video data as a function of one or more pixels neighboring the block using said determined extended intra prediction mode, wherein said predicting comprises: horizontally predicting said target pixel using a reference pixel of a left neighboring row and a reference pixel above and to the right of the block, or vertically predicting said target pixel using a reference pixel of an above neighboring row and a reference pixel left and below the block, or diagonally predicting said target pixel using reference pixels either above the block and above right of the block or left of the block and below left of the block; and, decoding the block of video of video data using the prediction.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
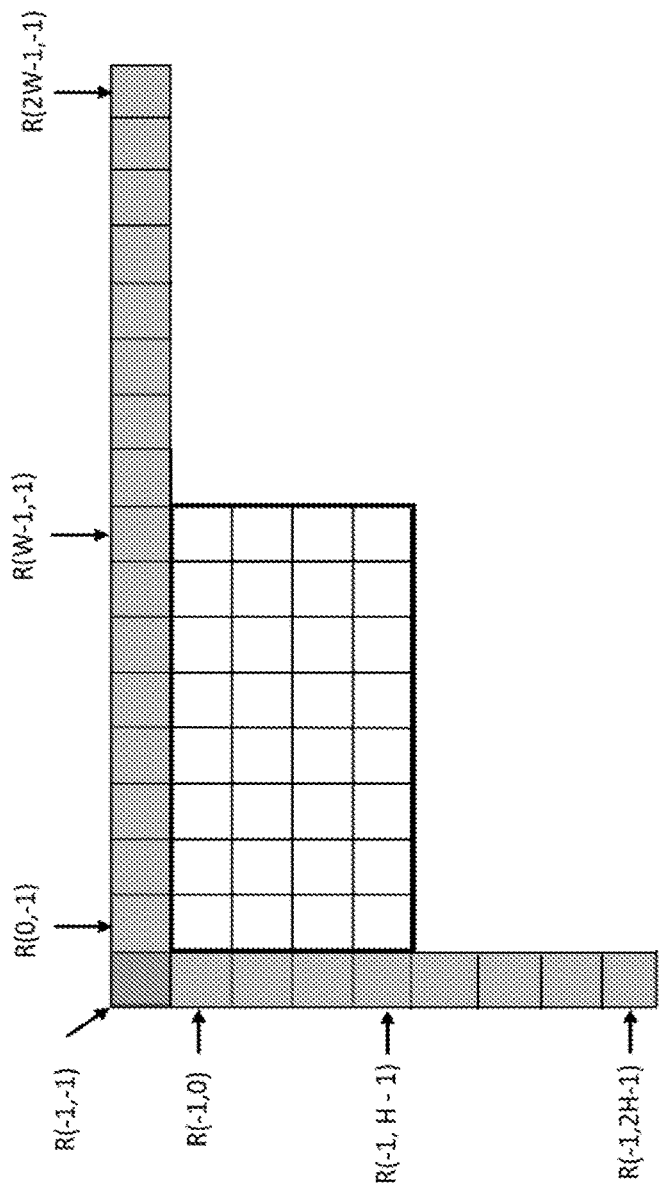
FIG. 1 shows reference samples for intra prediction in VTM.

The embodiments described here are in the field of video compression and relate to video compression and video encoding and decoding. In the Versatile Video coding (VVC) test model (VTM), any target block in intra prediction can have one of 67 prediction modes. Like HEVC, one is a PLANAR mode, one is a DC mode, and the remaining 65 are directional modes. The 65 directional modes are chosen from 95 directions, which include the 65 regular angles spanning from 45 degree to −135 degree if the target block is square, and potentially 28 wide angular directions when the block is rectangular. VTM encodes the prediction mode of a block using the Most Probable Mode (MPM) set, which consists of 6 prediction modes. If the prediction mode does not belong to the MPM set, it is truncated-binary encoded with 5 or 6 bits.

This invention aims at improving the prediction efficiency in intra prediction. It proposes three more prediction modes besides the existing 67 modes for any target block. With the inclusion of these modes, the MPM set is modified depending on if the prediction modes of the left and top neighbor blocks are directional or non-directional modes, or if they have the newly introduced prediction modes. If the prediction mode of the current block belongs to the MPM set, it is encoded using the variable-length coding scheme in VTM 3.0 software; otherwise, it is fixed-length coded using six bits, instead of the truncated-binary encoding scheme in VTM 3.0. The proposed modes are very general in nature, and they are not restricted to be used only in VTM, but can be included in any future video coding standard.

In this invention, it is proposed to add three additional modes which are meant to model slow changing intensity regions along horizontal, vertical, and diagonal directions. These modes are termed as Planar_horizontal, Planar_vertical, and Planar_diagonal modes, respectively. Inclusion of these three modes increases the total number of used intra prediction modes for a target block to 70. With the introduction of the three new prediction modes, the remaining set of prediction modes will contain 64 prediction modes. Thus, any prediction mode not belonging to the MPM set will be simply fixed-length encoded with 6 bits.

Intra prediction in video compression refers to the spatial prediction of a block of pixels using the information from the causal neighbor blocks, that is, the neighboring blocks in the same frame which have already been decoded. This is a powerful coding tool since it allows for high compression efficiency in INTRA frames, as well as in INTER frames whenever there is no better temporal prediction. Therefore, intra prediction has been included as a core coding tool in all video compression standards including H.264/AVC, HEVC, etc. In the following, for explanation purpose, we will refer to the intra prediction in Versatile Video Coding (VVC) software test model (VTM).

In VTM, encoding of a frame of video sequence is based on a quad-tree (QT)/multi-type tree (MTT) block structure. A frame is divided into non-overlapping square coding tree units (CTUs) which all undergo QT/MTT based splitting to multiple coding units (CUs) based on rate-distortion criteria. In Intra prediction, a CU is spatially predicted from the causal neighbor CUs, i.e., the CUs on the top and the left. For that purpose, VTM uses simple spatial models called prediction modes. Based on the decoded pixel values in the top and left CUs, called reference pixels, the encoder constructs different predictions for the target block and chooses the one that leads to the best RD performance. Out of the 95 defined modes, one is a planar mode (indexed as mode 0), one is a DC mode (indexed as mode 1) and the remaining 93 (indexed as mode −14 . . . −1, 2 . . . 80) are angular modes. Out of the 93 angular modes, only 65 adjacent modes are selected for any target CU depending on its shape. The angular modes aim to model the directional structures of objects in a frame. Therefore, the decoded pixel values in the top and left CUs are simply repeated along the defined directions to fill up the target CU. Some prediction modes can lead to discontinuities along the top and left reference boundaries, hence those prediction modes include a subsequent post-processing, known as position dependent intra prediction combination (PDPC), which aims to smoothen the pixel values along those boundaries.

The defined prediction modes model slow changing intensity regions as well as object directionalities quite well but when the object intensity changes slowly along certain directions, either the corresponding directional mode, or one of the two non-directional modes, will be chosen. To better model such regions, we propose three directional planar modes to be used in conjunction with the existing 67 modes. Before we describe the proposed modes, we briefly present the intra prediction in VTM 3.0 in the following. For easier reference, we will be using the terms "CU" and "block" interchangeably throughout the text.

The intra prediction process in VTM consists of three steps: (1) reference sample generation (2) intra sample prediction and (3) post-processing of predicted samples. The reference sample generation process is illustrated in FIG. 1, which shows reference samples for intra prediction in VTM. The reference pixel values at coordinates (x,y) are indicated in the figure by R(x,y). H and W represent the height and width of the current block, respectively. For a CU of size H×W, a row of 2W decoded samples on the top is formed from the previously reconstructed top and top right pixels to the current CU. Similarly, a column of 2H samples on the left is formed from the reconstructed left and below left pixels. The corner pixel at the top-left position is also used to fill up the gap between the top row and the left column references. If some of the samples on top or left are not available, because of the corresponding CUs not being in the same slice, or the current CU being at a frame boundary, etc., then a method called reference sample substitution is performed where the missing samples are copied from the available samples in a clock-wise direction. Then, depending on the current CU size and the prediction mode, the reference samples are filtered using the low-pass filter with coefficients [¼, ½, ¼], which is applied vertically on the left reference column and horizontally on the top reference row.

Figure 2:
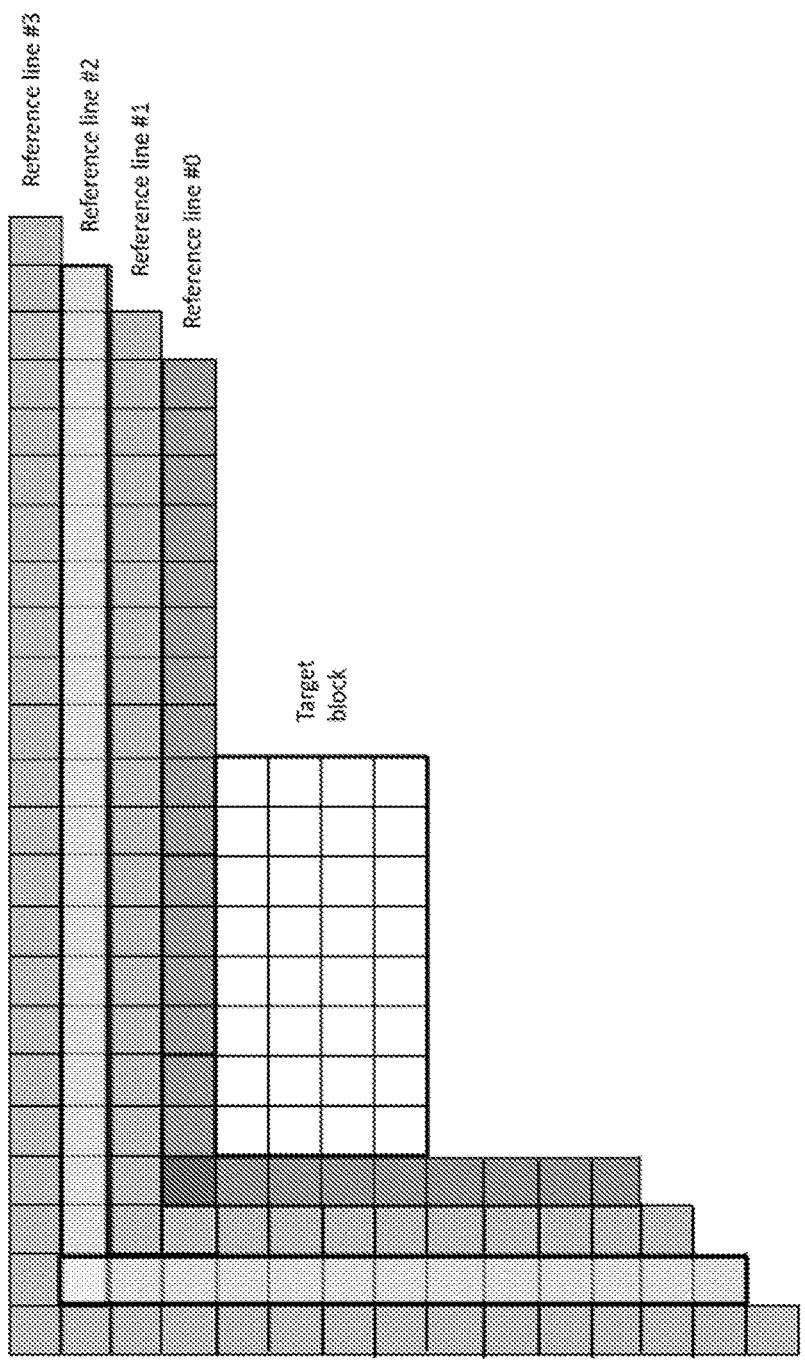
FIG. 2 shows multiple reference lines for intra prediction in VTM.

VTM 3.0. also supports intra prediction with multiple reference lines (MRL). The idea is to make the prediction based on several sets of reference lines as shown in FIG. 2, and then to choose the reference line giving the best rate-distortion performance. The reference line used is signaled to the decoder with a variable length code. FIG. 2 shows multiple reference lines for intra prediction in VTM. The reference lines are indexed in order of their distance from the target block. The reference line closest to the target block is indexed 0. Another two referenced lines used for prediction are indexed 1 and 3, for example. With three reference lines as in FIG. 2, which is used in VTM 3.0, the reference lines with index 0, 1 and 3 are signaled with bits "0", "10", and "11" respectively. Different reference lines can be used. Furthermore, to restrict the added complexity of search for the best prediction mode, the reference lines 1 and 3 are tested with only six angular prediction modes, which are derived in the same manner as the modes in the MPM list but excluding the PLANAR and DC modes. In the following, for easier understanding, we restrict our description to only the first reference line, as in FIG. 1, as using multiple is obvious and could easily be deduced from the following description. The usage of multiple reference lines, as in VTM 3.0 is still applicable, and in no way it forbids the application of the new modes with the first reference line. This is obvious and can be easily deduced from the following descriptions.

Figure 3:
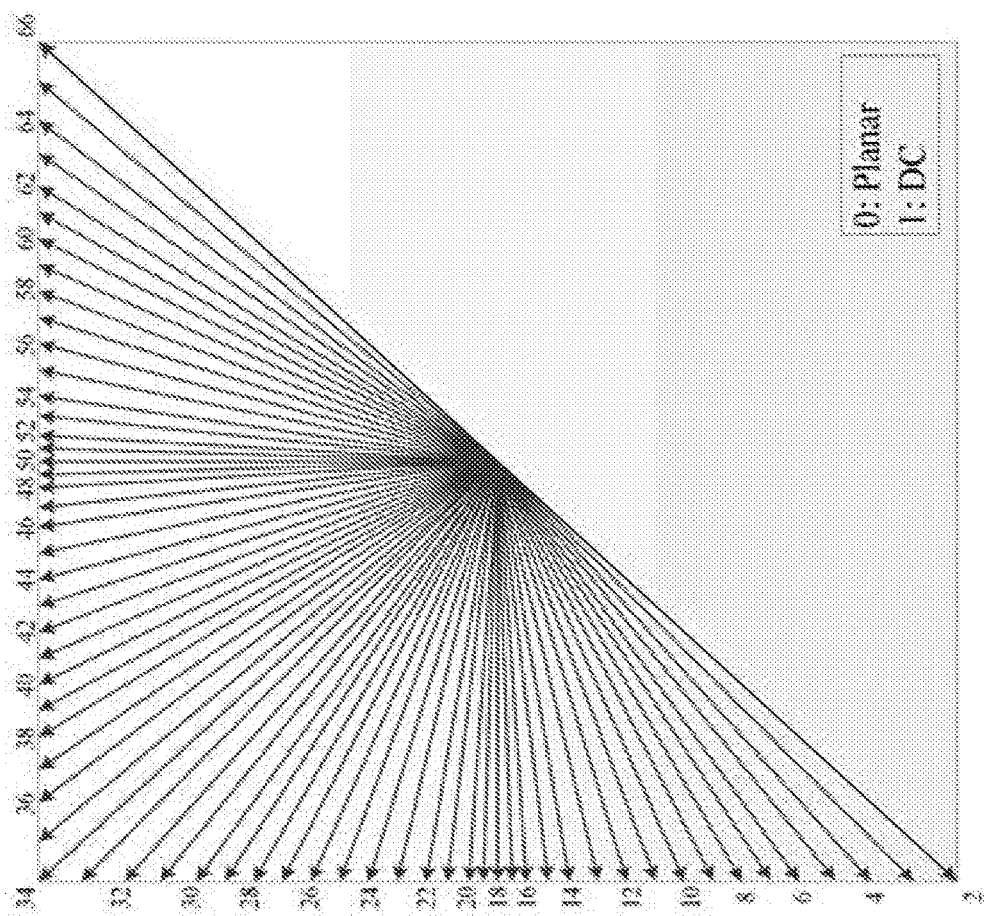
FIG. 3 shows intra prediction directions in VTM for a square target block.

The next step, i.e., the intra sample prediction, consists of predicting the pixels of the target CU based on the reference samples. As mentioned before, in order to predict different kinds of content efficiently, VTM supports a range of prediction models. Planar and DC prediction modes are used to predict smooth and gradually changing regions, whereas angular prediction modes are used to capture different directional structures. VTM supports 95 directional prediction modes which are indexed from −14 to −1 and from 2 to 80. For a square CU, only the prediction modes 2-66 are used. These prediction modes correspond to different prediction directions from 45 degree to −135 degree in clockwise direction, as illustrated in FIG. 3, which shows intra prediction directions in VTM for a square target block. In general, non-square blocks can also be used with extended prediction directions, but this figure shows a square block. The numbers denote the prediction mode index associated with the corresponding direction. Modes 2 to 33 indicate horizontal predictions and modes 34 to 66 indicate vertical predictions.

Modes with indexes from −14 to −1 and indexes from 67 to 80 are wide angular modes which are used for rectangular blocks of different shapes. Modes −14 to −1 are defined beyond mode 2 (beyond angle 45 degree), and are used for tall rectangular blocks (blocks with height greater than width). Analogously, modes 67 to 80 are defined beyond mode 66 (beyond angle −135 degree), and are used for flat rectangular blocks (blocks with width greater than height). The number of wide angular modes used for a rectangular block depends on the aspect ratio of the block. In any case, the total number of angular modes used for any block is 65 and the modes are always contiguous in direction. The angular prediction modes used for different block shapes is summarized in Table 1.

TABLE 1

Range of intra prediction modes for different target block shapes in VTM. W/H refers to the width-to-height ratio of the block.

| W/H ratio | Range of intra prediction modes | No of wide angular modes | No of regular angular modes |
| --- | --- | --- | --- |
| 1 | 2: 66 | 0 | 65 |
| 2 | 8: 72 | 6 | 59 |
| 4 | 12: 76 | 10 | 55 |
| 8 | 14: 78 | 12 | 53 |
| 16 | 16: 80 | 14 | 51 |
| 1/2 | −6: −1, 2: 60 | 6 | 59 |
| 1/4 | −10: −1, 2: 56 | 10 | 55 |
| 1/8 | −12: −1, 2: 54 | 12 | 53 |
| 1/16 | −14: −1, 2: 52 | 14 | 51 |

To define the angle corresponding to any prediction mode, VTM specifies an angle parameter, A or intraPredAngle, which is given as the offset of the predictor reference sample position with respect to the target pixel at (0,0). The offset is expressed as multiples of ($1/32$) of the sampling interval. In other words, the prediction directions have a resolution of ($1/32$) of the sampling interval. In VTM 3.0, any predictor reference sample inside the sampling interval is computed as a linear interpolation of the two nearest reference samples. Except for the wide angles, the angle parameter values have been changed slightly from those specified in HEVC to adapt to different rectangular block shapes so that the prediction modes used for any target block are aligned with its vertical diagonal in the clock-wise direction. Thus, the intra prediction directions are adaptive to the target block shape. Table 2 show the intraPredAngle values for angular prediction modes for a square CU.

TABLE 2

Angle parameter A or intraPredAngle, for angular prediction modes for a square CU in VTM 3.0.

Horizontal directions

| Mode index | 2 | 3 | 4 | 5 | 6 | 7 | 8 | 9 | 10 | 11 | 12 | 13 | 14 | 15 | 16 | 17 |
| --- | --- | --- | --- | --- | --- | --- | --- | --- | --- | --- | --- | --- | --- | --- | --- | --- |
| A | 32 | 29 | 26 | 23 | 20 | 18 | 16 | 14 | 12 | 10 | 8 | 6 | 4 | 3 | 2 | 1 |

| Mode index | 18 | 19 | 20 | 21 | 22 | 23 | 24 | 25 | 26 | 27 | 28 | 29 | 30 | 31 | 32 | 33 |
| --- | --- | --- | --- | --- | --- | --- | --- | --- | --- | --- | --- | --- | --- | --- | --- | --- |
| A | 0 | −1 | −2 | −3 | −4 | −6 | −8 | −10 | −12 | −14 | −16 | −18 | −20 | −23 | −26 | −29 |

Vertical directions

| Mode index | 34 | 35 | 36 | 37 | 38 | 39 | 40 | 41 | 42 | 43 | 44 | 45 | 46 | 47 | 48 | 49 | 50 |
| --- | --- | --- | --- | --- | --- | --- | --- | --- | --- | --- | --- | --- | --- | --- | --- | --- | --- |
| A | −32 | −29 | −26 | −23 | −20 | −18 | −16 | −14 | −12 | −10 | −8 | −6 | −4 | −3 | −2 | −1 | 0 |

| Mode index | 51 | 52 | 53 | 54 | 55 | 56 | 57 | 58 | 59 | 60 | 61 | 62 | 63 | 64 | 65 | 66 |
| --- | --- | --- | --- | --- | --- | --- | --- | --- | --- | --- | --- | --- | --- | --- | --- | --- |
| A | 1 | 2 | 3 | 4 | 6 | 8 | 10 | 12 | 14 | 16 | 18 | 20 | 23 | 26 | 29 | 32 |

The angular prediction modes can describe image regions containing object structures with different directionalities. The PLANAR and DC modes describe constant and gradually changing regions without any particular directionality. If any region is having slow and changing regions along certain directions, they will be inadequately described by either a corresponding angular mode, or the PLANAR or the DC mode. We propose three simple modes to describe such regions. With these three modes, the encoding of a prediction mode, if it does not belong to the MPM list, will simply require 6 bits, instead of the existing truncated binary encoding.

For generality, in the following we will assume rectangular blocks having width W and height H. Square target blocks are special cases with W=H. The following three prediction modes are proposed to be used together with other sixty seven modes in the normal fashion with a reference row on the top and a reference column on the left, as in HEVC. In the case of multiple reference line intra prediction, as in VTM 3.0, they are proposed to be used with only the first reference line.

The PLANAR mode (indexed as mode 0) consists of averaging of two interpolations: a horizontal interpolation between the reference samples on the left and the top-right reference sample (that is, the reference sample at (W,−1)), and a vertical interpolation between the reference samples on the top and the bottom-left reference sample (that is, the reference sample at (−1,H)). The prediction is followed with PDPC to smooth out the boundary samples. In the planar_horizontal mode, we use only the horizontal interpolation and follow it with a simple filtering of the first-row samples. Similarly, in the planar_vertical mode, we use only the vertical interpolation and follow it with a simple filtering of the first column samples.

In the planar_horizontal mode, using the top-right reference sample R(W,−1), and the reference samples on the left of the target block, R(−1,y), 0<=y<H, the linear interpolation is performed as:

$$P_h(x,y)=(W-1-x)*R(-1,y)+(1+x)*R(W,-1), 0 \le x < W, 0 \le y < H.$$

$$P(x,y)=(P_h(x,y)+W/2) >> \log 2(W), 0 \le x < W, 0 \le y < H$$

Figure 4:
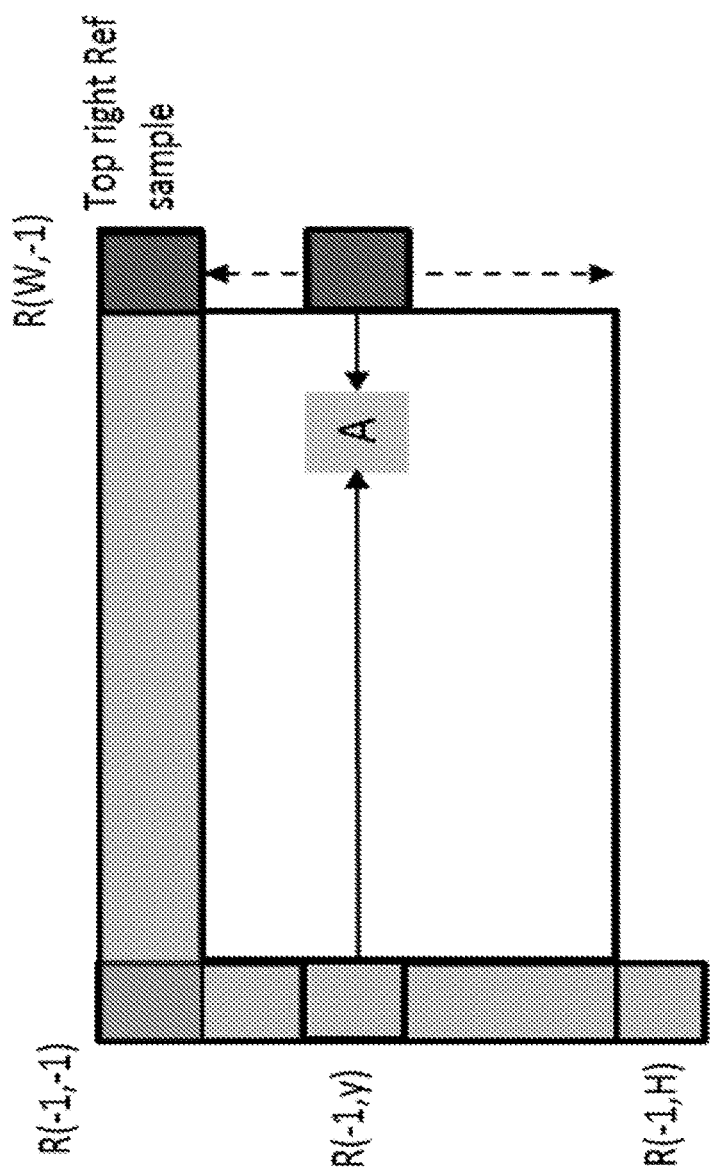
FIG. 4 shows planar_horizontal prediction under the general aspects described.

The planar_horizontal mode is shown in FIG. 4.

Then the samples on the first row are smoothed using the filter [1, 2, 1] as:

$$P(x,0)=(2*P(x,0)+P(x,1)+R(x,-1)) >> 2, 0 \le x < W.$$

In the planar_vertical mode, using the bottom_left reference sample R(−1,H), and the reference samples on the top of the target block, R(x,−1), 0<=x<W, the linear interpolation is performed as:

$$P_v(x,y)=(H-1-y)*R(x,-1)+(1+y)*R(-1,H), 0 \le x < W, 0 \le y < H;$$

$$P(x,y)=(P_v(x,y)+H/2) >> \log 2(H), 0 \le x < W, 0 \le y < H$$

Figure 5:
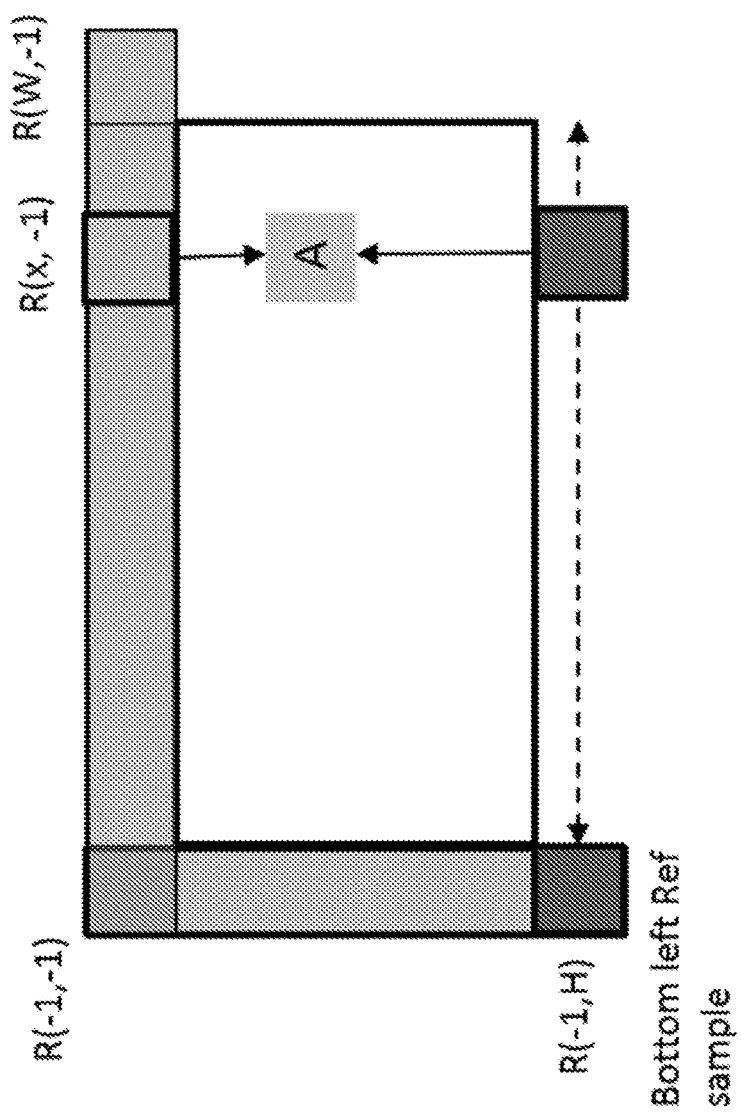
FIG. 5 shows planar_vertical prediction under the general aspects described.

The planar_vertical mode is shown in FIG. 5.

Then the samples on the first column are smoothed using the filter [1, 2, 1] as:

$$P(0,y)=(2*P(0,y)+P(1,y)+R(-1,y)) >> 2, 0 \le y < H.$$

In both these predictions, we can, alternatively, replace the simple smoothing filter with more advanced filters such as used in PDPC for purely horizontal and purely vertical prediction modes (modes 18 and 50).

Planar-diagonal mode is a variation of the diagonal mode (mode 34). Instead of repeating the reference samples on the top and left along the diagonal direction, we linearly interpolate the samples, as in the PLANAR mode, using the reference samples on the top and the left, and the "estimated" reference samples on the right and the bottom, of the block. The latter reference samples are first computed using linear interpolation between the top_right and the bottom_left reference samples and the estimated bottom_right sample. The bottom_right sample is computed as the average of the reference samples at (2 W−1, −1) and (−1, 2H−1):

First, we estimate the bottom_right sample as:

$$P(W,H)=(R(-1,2H-1)+R(2W-1,-1)+1) >> 1.$$

Alternatively, we can use top_right and the bottom_left reference samples to estimate the bottom_right sample as follows, but with more complexity:

$$P(W,H)=(H*R(-1,H)+W*R(W,-1)+(W+H)/2)/(W+H).$$

Then using the bottom_left reference sample R(−1,H) and the bottom_right sample, we linearly interpolate the samples at the bottom of the target block:

$$P_b(x,H)(W-1-x)*R(-1,H)+(1+x)*P(W,H), 0 \le x < W.$$

$$P_b(x,H)=(P_b(x,H)+W/2) >> \log 2(W), 0 \le x < W$$

Similarly, using the top_right reference sample R(W,−1) and the bottom_right sample, we linearly interpolate the samples on the right of the target block:

$$P_r(W,y)=(H-1-y)*R(W,-1)+(1+y)*P(W,H), 0 \le y < H;$$

$$P_r(W,y)=(P_r(W,y)+H/2) >> \log 2(H), 0 \le y < H;$$

Using these samples, we construct an array of size 1+W+H, called rightColumn, as follows:

rightColumn[k]=$P_r(W,k)$, 0≤k<H;

rightColumn[H]=P(W,H);

rightColumn[H+k]=$P_b(W-k,H)$, 1≤k≤W.

Similarly, using the reference samples on the top and on the left, we construct another array of size 1+W+H, called leftColumn, as follows:

leftColumn[k]=R(W−1−k,−1), 0≤k<W;

leftColumn[W]=R(−1,−1);

leftColumn[W+k]=R(−1,k−1), 1≤k≤H.

Then, we compute the predicted sample values by linearly interpolating between the leftColumn and rightColumn as follows:

$$P(x,y)=(L-1-p)*\text{leftColumn}[k]+(1+p)*\text{rightColumn}[k], 0 \le x < W, 0 \le y < H;$$

$$P(x,y)=(P(x,y)+L/2) >> \log 2(L), 0 \le x < W, 0 \le y < H;$$

where, k=W−x+y, L=min(W,H), and p=min(x,y).

Figure 6:
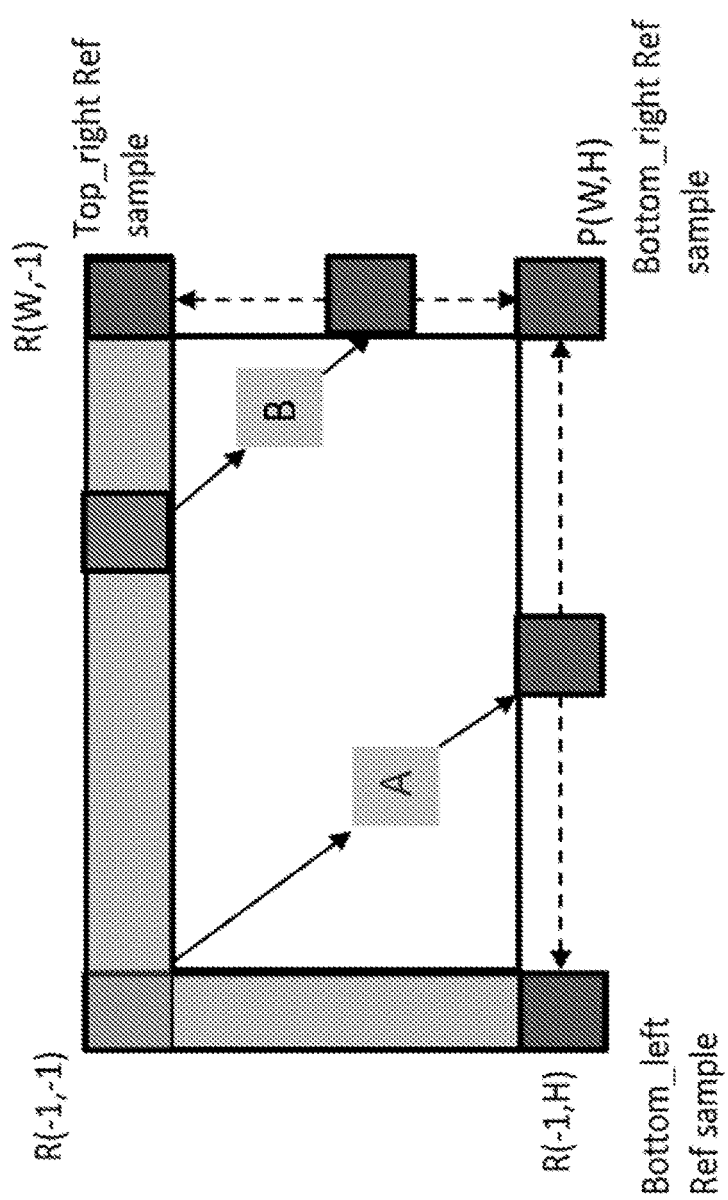
FIG. 6 shows planar_diagonal prediction mode under the general aspects described.

The interpolation for planar_diagonal mode is shown in FIG. 6.

Figure 7:
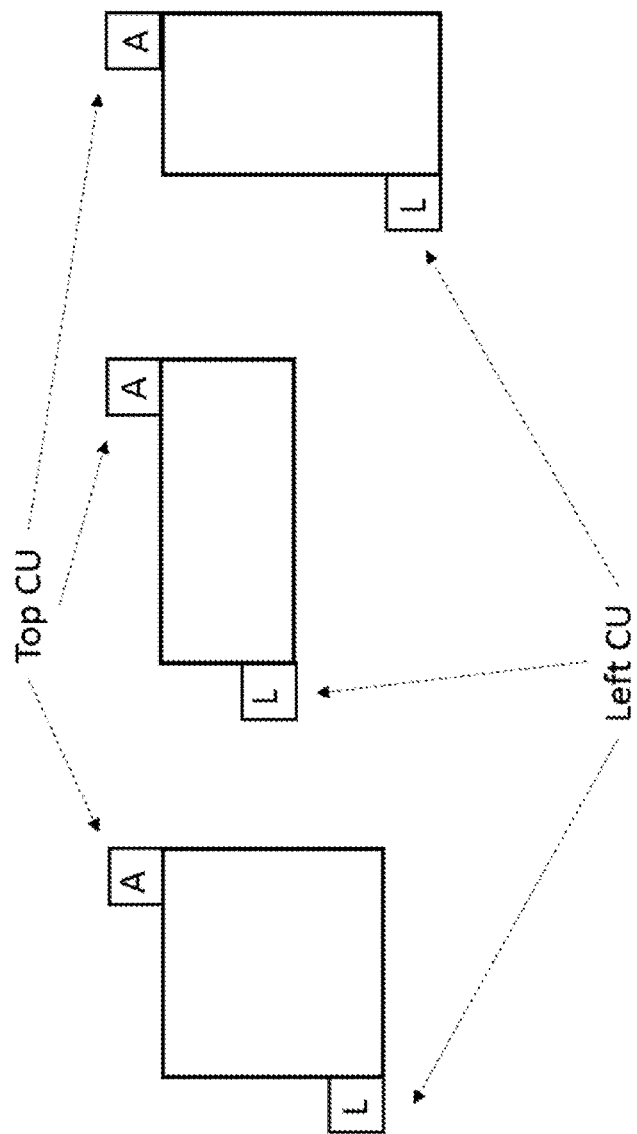
FIG. 7 shows top and left coding unit (CU) locations for deriving the most probable mode (MPM) list in a prior proposal for different target block shapes.

VTM uses the concept of MPM set to encode the prediction mode of the luma component. An MPM consists of 6 distinct prediction modes which are derived using the prediction modes of the left and top neighbor blocks. The top and left blocks used for deriving the MPM list in a prior proposal for different target block shapes are shown in FIG. 7.

In one prior proposal, the MPM list is constructed as follows:

```
L = prediction mode of the left CU (value in range [0 - 66])
A = prediction mode of the above CU (value in rage [0 - 66])
offset = NUM_LUMA_MODES - 6 (= 61)
mod = offset + 3 (= 64)
Initialization:
    MPM[0] = L;
    MPM[1] = !L (0 if L # 0, else 1)
    MPM[2] = VER_IDX
    MPM[3] = HOR_IDX
    MPM[4] = VER_IDX - 4
    MPM[5] = VER_IDX + 4
If L = A
    If L > DC_IDX
        MPM[0] = L;
        MPM[1] = PLANAR_IDX
        MPM[2] = DC_IDX
        MPM[3] = ((L + offset) % mod) + 2
        MPM[4] = ((L - 1) % mod) + 2
        MPM[5] = ((L + offset - 1) % mod) + 2
    Else,
        Use initialized values.
Else (i.e. if L ≠ A)
    If L > DC_IDX and A > DC_IDX
        MPM[0] = L;
        MPM[1] = A
        MPM[2] = PLANAR_IDX
        MPM[3] = DC_IDX
        MPM[4] = ((max(L,A) + offset) % mod) + 2 if L and A are
            not adjacent = ((max(L,A) + offset - 1) % mod) + 2,
        otherwise MPM[5] = ((max(L,A) - 1) % mod) + 2 if L and A
            are not adjacent = ((max(L,A) - 0) % mod) + 2 otherwise
    Else if L + A >= 2 (i.e., only one out of L and A is either DC
    or PLANAR)
        MPM[0] = L;
        MPM[1] = A
        MPM[2] = !(min(L,A)) (0 if min(L,A) = 1, else 0)
        MPM[3] = ((max(L,A) + offset) % mod) + 2
        MPM[4] = ((max(L,A) - 1) % mod) + 2
        MPM[5] = ((max(L,A) + offset - 1) % mod) + 2
    Else (i.e. one of L and A is PLANAR and the other is DC)
        Use the initialized values.
```

Using circular adjacency over the range [2-66] (i.e., 2 and 65 are adjacent), we can equivalently, write $$((L+\text{offset}) \% \text{mod})+2 \equiv L-1$$

$$((L+\text{offset}-1) \% \text{mod})+2 \equiv L-2$$

$$((L-1) \% \text{mod})+2 \equiv L+1$$

$$((L-0) \% \text{mod})+2 \equiv L+2$$

Using these equivalence relationships, we can show the MPM list derivation for different cases as in Table 3.

TABLE 3

MPM derivation in a prior proposal. A and L denote the prediction modes of Above and Left CUs respectively.

| | Conditions | MPM[0] | MPM[1] | MPM[2] | MPM[3] | MPM[4] | MPM[5] |
|---|---|---|---|---|---|---|---|
| L = A | L ≠ PLANAR_IDX and L ≠ DC_IDX | L | PLANAR_IDX | DC_IDX | L − 1 | L + 1 | L − 2 |
| | Otherwise | L | !L | VER_IDX | HOR_IDX | VER_IDX − 4 | VER_IDX + 4 |
| L ≠ A | L > DC and A > DC | L | A | PLANAR_IDX | DC_IDX | Max(L,A) − 2, if L and A are adjacent else max(L,A) − 1 | Max(L,A) + 2, if L and A are adjacent else max(L,A) + 1 |
| | Otherwise L + A >= 2 | L | A | !Min(L,A) | Max(L,A) − 1 | Max(L,A) + 1 | Max(L,A) − 2 |
| | otherwise | L | A | VER_IDX | HOR_IDX | VER_IDX − 4 | VER_IDX + 4 |

If the prediction mode of the current block is equal to one of the six MPM modes, this is indicated by setting the mpmFlag to 1, and then encoding the candidate mode from the MPM list using the variable length coding scheme shown in Table 4.

TABLE 4

MPM encoding in a prior proposal

| Candidate Index | code |
|---|---|
| MPM[0] | 0 |
| MPM[1] | 10 |
| MPM[2] | 110 |
| MPM[3] | 1110 |
| MPM[4] | 11110 |
| MPM[5] | 11111 |

Else, the mpmFlag is set to 0 and the index of the mode in the remaining list of 61 modes is truncated-binary encoded. The first three modes in the list (index 0-2) are encoded with 5 bits whereas the remaining 58 (index 3-60) are encoded with 6 bits each.

With the newly introduced modes, we propose to construct the MPM list as in the following:

Let us index the three new modes as PLANAR_HOR_IDX (index=67), PLANAR_DIA_IDX (index=68) and PLANAR_VER_IDX (index=69). It is to note here that these indexes are meant only for the encoding purpose, and are not to be confused with the indexes of the actual prediction modes. The prediction modes with indexes 67-69 are already associated with wide angular directions as we have mentioned earlier. But, as VTM supports only 67 prediction modes, which are indexed from 0 to 66 for encoding purpose, it is appropriate to index the newly introduced modes as above since we extend the number of modes.

```
L = prediction mode of the left CU (value in range [0 - 69])
A = prediction mode of the above CU (value in range [0 - 69])
modeIdx = 0;
if L > VDIA_IDX, modeIdx = modeIdx + 1;
if A > VDIA_IDX and A = L, modeIdx = modeIdx + 1;
if L = A
    if modeIdx = 0
        if L > DC_IDX
            mpm[0] = L;
            mpm[1] = PLANAR_IDX;
            mpm[2] = DC_IDX;
            mpm[3] = ((L + offset) % mod) + 2;
            mpm[4] = ((L - 1) % mod) + 2;
            mpm[5] = PLANAR_DIA_IDX
```

```
        else
            mpm[0] = PLANAR_IDX;
            mpm[1] = DC_IDX;
            mpm[2] = VER_IDX;
            mpm[3] = PLANAR_DIA_IDX;
            mpm[4] = PLANAR_VER_IDX;
            mpm[5] = PLANAR_HOR_IDX;
        else (i.e,, modeIdx = 1)
            mpm[0] = L;
            mpm[1] = PLANAR_IDX;
            mpm[2] = DC_IDX;
            mpm[3] = VER_IDX;
            if L = PLANAR_VER_IDX
                mpm[4] = PLANAR_DIA_IDX;
                mpm[5] = PLANAR_HOR_IDX;
            else if L = PLANAR_HOR_IDX
                mpm[4] = PLANAR_DIA_IDX;
                mpm[5] = PLANAR_VER_IDX;
            else
                mpm[4] = PLANAR_VER_IDX;
                mpm[5] = PLANAR_HOR_IDX;
    else (i.e., L ≠ A)
        mpm[0] = L;
        mpm[1] = A;
        if modeIdx = 0
            if L*A > 0
                mpm[2] = PLANAR_IDX;
            else
                mpm[2] = (L + A) < 2 ? VER_IDX : DC_IDX;
            mpm[3] = PLANAR_DIA_IDX;
            mpm[4] = PLANAR_VER_IDX;
            mpm[5] = PLANAR_HOR_IDX;
        else if modeIdx = 1
            Let maxCandIdx = 0, if mpm[0] > mpm[1]
                = 1, otherwise
            if mpm [ !maxCandIdx] < 2 (i.e., smaller mode is
            PLANAR of DC)
                mpm[2] = mpm[ !maxCandIdx] ==
                PLANAR_IDX ? DC_IDX : PLANAR_IDX;
                mpm[3] = VER_IDX;
            else (i.e, smaller mode is angular)
                mpm[2] = PLANAR_IDX;
                mpm[3] = DC_IDX;
            if mpm[maxCandIdx] = PLANAR_DIA_IDX
                mpm[4] = PLANAR_VER_IDX;
                mpm[5] = PLANAR_HOR_IDX;
            else if mpm [maxCandIdx] = PLANAR_VER_IDX
                mpm[4] = PLANAR_DIA_IDX;
                mpm[5] = PLANAR_HOR_IDX;
            else
                mpm[4] = PLANAR_DIA_IDX;
                mpm[5] = PLANAR_VER_IDX;
        Else (i.e., modeIdx = 2)
            mpm[2] = PLANAR_IDX;
            mpm[3] = DC_IDX;
            mpm [4] = VER_IDX;
            if (L + A < 136)
                mpm [5] = PLANAR_VER_IDX;
            else if (L + A > 136)
                mpm[5] = PLANAR_HOR_IDX;
            else
                mpm[5] = PLANAR_DIA_IDX;
```

If the prediction mode of the current block is equal to one of the six MPM modes, this is indicated by setting the mpmFlag to 1 and then encoding the candidate mode from the MPM list using the variable length coding scheme in Table 4. Else, the mpmFlag is set to 0 and the index of the mode in the remaining list of 64 modes is binary encoded with 6 bits.

It is to note that the proposed modes are non-angular and are meant to describe slow changing intensity regions along the associated directions. In the above MPM list construction method, we have given them higher preference compared to angular modes in the same manner as the PLANAR and DC modes are given higher preference in the existing MPM list construction in VTM 3.0. The reason for doing so is our expectation that these new modes will be more likely than other angular modes but may be less likely than the PLANAR or the DC modes. Other MPM list constructions are, thus, possible that do not use this implicit idea. For example, the original MPM list construction method can be used with the mapping of the new modes to nearest directional modes, or to the PLANAR mode. If the prediction mode of the left or above neighbor block is equal to the planar_vertical mode, it can be replaced with vertical mode VER_IDX, or the PLANAR mode. If the prediction mode of the left or above neighbor block is equal to the planar_horizontal mode, it can be replaced with horizontal mode HOR_IDX, or the PLANAR mode. Similarly, if the prediction mode of the left or above neighbor block is equal to the planar_diagonal mode, it can be replaced with diagonal mode DIA_IDX, or the PLANAR mode. In these cases, the newly introduced modes will belong to the list of remaining modes and will require 6 bits each for encoding. Another method of MPM construction is to include the new modes in the MPM list if they happen to be the prediction modes of the left or top neighbor blocks, but also to include the associated directional modes (i.e., VER_IDX, or HOR_IDX, of DIA_IDX) along with the PLANAR and the DC modes. In this case, the adjacent modes of the corresponding directional modes can also be included in the MPM list if the number of candidates is still less than six. We present several embodiments below which incorporate these methods of MPM list construction.

Figure 8:
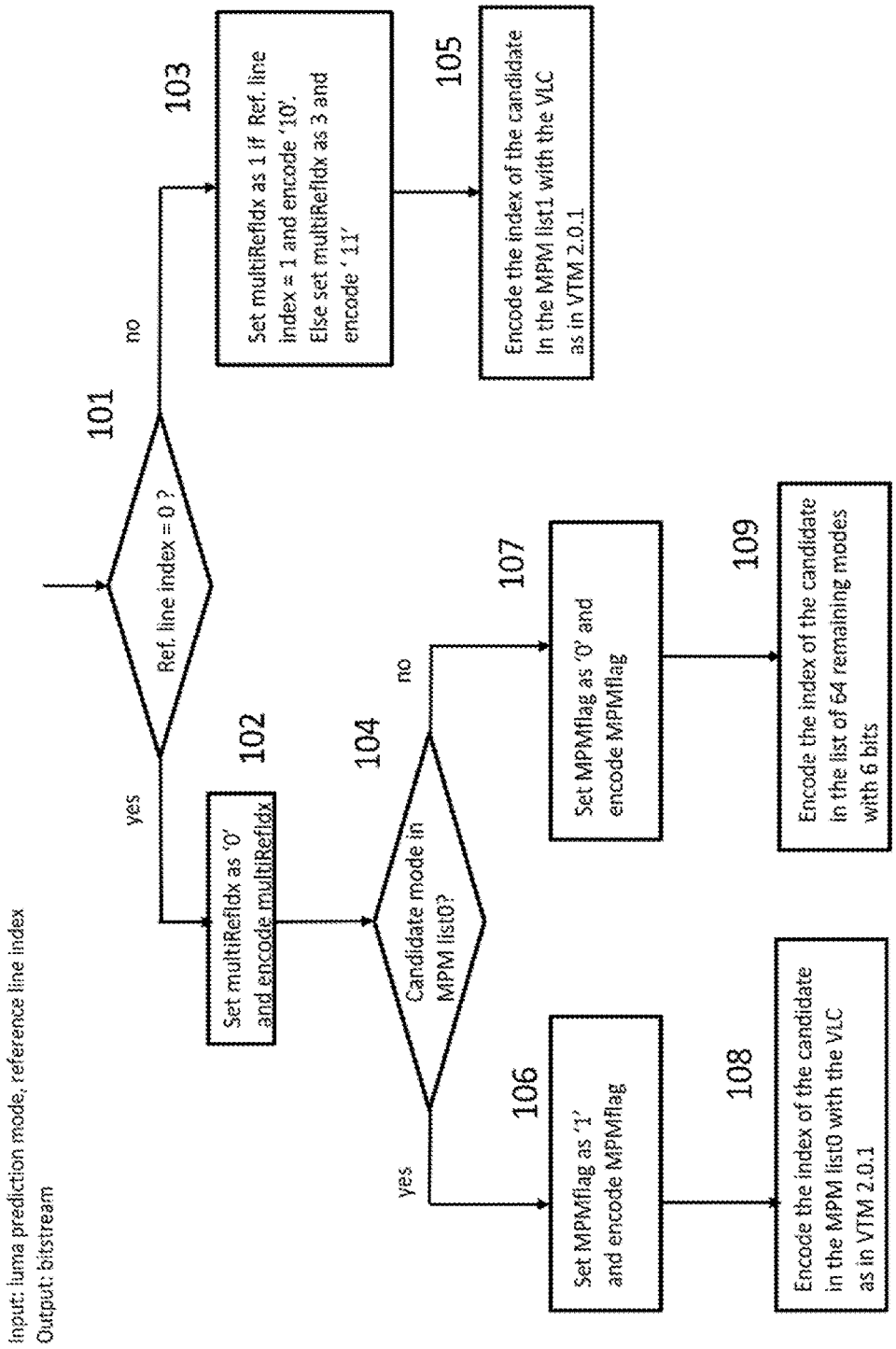
FIG. 8 shows a flow chart for encoding using a prediction mode of embodiment 1.
Figure 9:
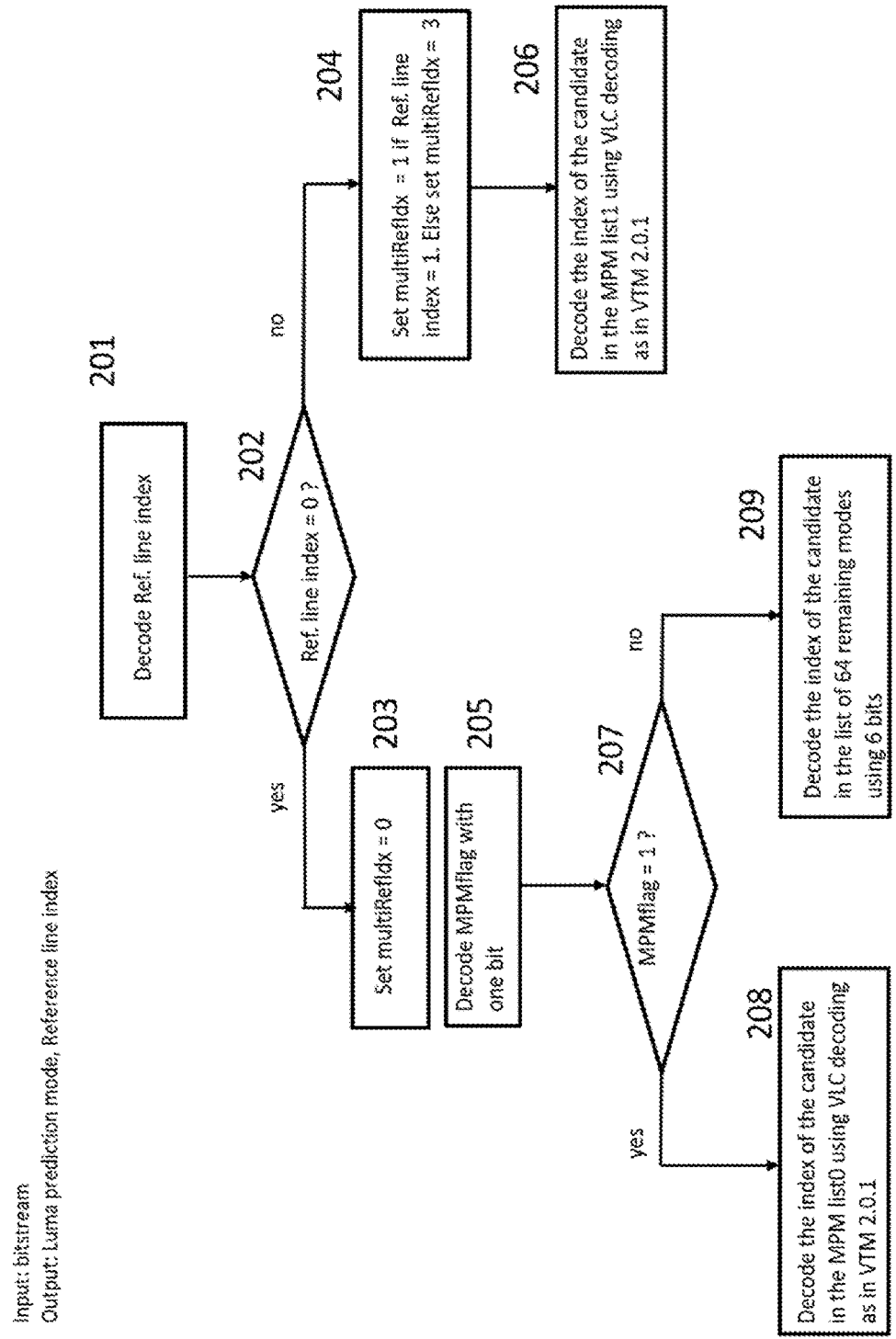
FIG. 9 shows a flow chart for decoding using a prediction mode of embodiment 1.

Embodiment 1: In this Embodiment, we include the proposed three prediction modes in intra prediction. Besides the already existing 67 prediction modes, these three modes are checked for RD performance when considering the first reference line. When considering other reference lines, only six angular modes are checked for RD performance, as in VTM 3.0. If the first reference line produces the best prediction, this is signaled with bit '0' and then the corresponding prediction mode is encoded using the MPM list (MPM list 0) as derived in the previous section. If the prediction mode belongs to the MPM list, the MPMflag is encoded as '1' followed by the encoding of the index of the prediction mode in the MPM list. Else the MPMflag is encoded as '0' followed by fixed-length encoding of the index of the prediction mode in the set of remaining modes with 6 bits. Otherwise, if the second or the fourth reference line produces the best prediction, this is signaled with bits "10" (for $2^{nd}$ reference line) or "11" (for $4^{th}$ reference line) and the prediction mode is encoded using the MPM list for reference lines with index 1 and 3 (MPM list 1), as derived in VTM 3.0. In this case, MPMflag is not encoded since the prediction mode always belongs to the MPM list (MPM list 1). At the decoder side, the decoder first decodes the reference line index. If the reference line index equals '0', it decodes the MPMflag, and then depending on the MPMflag value, it decodes the index of the prediction mode in the MPM list 0, or in the remaining modes list (the list containing all modes except those in MPM list 0). Otherwise, if the reference line index is greater than 0, the decoder simply decodes the index of the prediction mode in the MPM list 1. For any reference line, the encoder and the decoder derive the same MPM list (MPM list 0 or list 1); thus the decoder decodes the prediction mode correctly from the decoded index value in the MPM list (list 0 with reference line #0 or list 1 with reference line #1 or #3), or in the remaining modes list (reference line #0). The flow charts for the encoding and decoding of the prediction mode of the current block are shown in FIG. 8 and FIG. 9, respectively.

Embodiment 2: In this embodiment, the inclusion of the proposed three modes is made optional with a mode extension flag. If the flag is enabled, then 70 intra prediction modes are considered for intra prediction with the first reference line, and the encoding and decoding of the prediction mode for any target block is performed as in Embodiment 1. Else, the existing 67 intra prediction modes are considered and the encoding and decoding of the prediction mode is performed as in VTM 3.0. The mode extension flag can be set at the CU level, or at the slice level, in PPS or SPS.

Embodiment 3: In this Embodiment, we include the proposed three modes for intra prediction with the first reference line, as in Embodiment 1 or 2, but the construction of the MPM list to be used with the first reference line is any other method than that described in the previous section. For example, we can map the new modes to the associated directional modes if they happen to be the prediction modes of the left or top neighbor block. In this case, we can use the existing MPM list construction method in VTM 3.0 using these directional modes. The new prediction modes will be thus forced to belong to the list of remaining 64 modes, thus requiring 6 bits for encoding. Another example is to include the neighbor mode in the MPM list, even if it is one of the new modes, and also include the corresponding directional mode along with the PLANAR and DC modes.

The proposed prediction modes were implemented by incorporating them in VTM 3.0 software. The implementation was performed as in Embodiment 1. At the encoder side, the three prediction modes are first tested for fast RD pass along with the PLANAR and DC modes, with the first reference line. For reference lines 1 and 3, the MPM list construction remained unchanged (list 1) and the modes in the list were tested for RD performance with both reference lines 1 and 3. The BD-rate performance of the tested method is shown in Table 5. Observe that the proposed method results in Luma BD-rate gain of −0.07%. The gain is most pronounced for Class A1 sequences where the proposed modes are more likely due to very high frame resolutions.

TABLE 5

BD-rate performance of Embodiment 1 compared to VTM 3.0 anchor.

| | Over VTM-3.0 | | | | |
|---|---|---|---|---|---|
| | Y | U | V | EncT | DecT |
| Class A1 | −0.24% | −0.19% | −0.03% | 102% | 102% |
| Class A2 | −0.06% | 0.04% | 0.01% | 103% | 104% |
| Class B | −0.05% | 0.03% | 0.03% | 103% | 103% |
| Class C | −0.04% | 0.03% | −0.13% | 102% | 100% |
| Class E | 0.00% | 0.04% | 0.24% | 103% | 100% |
| Overall | −0.07% | 0.00% | 0.01% | 103% | 102% |
| Class D | −0.07% | 0.12% | −0.06% | 105% | 105% |

Figure 10:
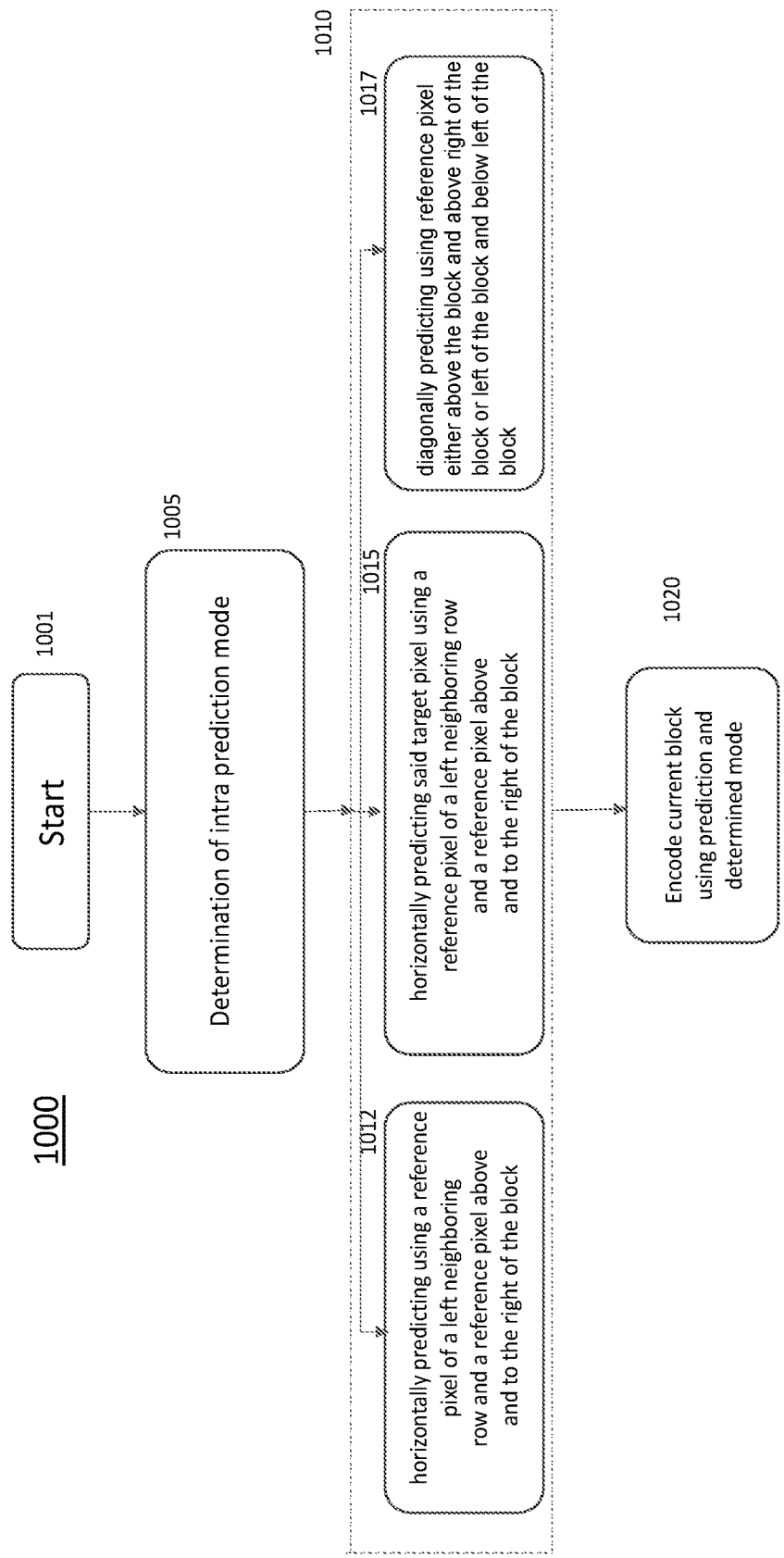
FIG. 10 shows one embodiment of an encoding method under the general aspects described.

One embodiment of a method 1000 for encoding a block of video data using the general aspects described here is shown in FIG. 10. The method commences at Start block 1001 and control proceeds to function block 1005 for determining an extended intra prediction mode to be used to encode a block of video data. Control then proceeds from block 1005 to block 1010 for predicting target pixels of the block of video data using the determined extended intra prediction mode. Depending on the determined extended intra prediction mode, control proceeds to one of several predictions. If the determined extended prediction mode is a planar horizontal mode, control proceeds to function block 1012 for horizontally predicting the target pixel using a reference pixel of a left neighboring row and a reference pixel above and to the right of the block. Or, if the determined extended prediction mode is a planar vertical mode, control proceeds to function block 1015 for vertically predicting said target pixel using a reference pixel of an above neighboring row and a reference pixel left and below the block. Or, if the determined extended prediction mode is a planar diagonal mode, control proceeds to function block 1017 for diagonally predicting said target pixel using reference pixels either above the block and above right of the block or left of the block and below left of the block. Control proceeds from block 1010 to block 1020 for encoding the video block using said prediction in an extended intra coding mode.

Figure 11:
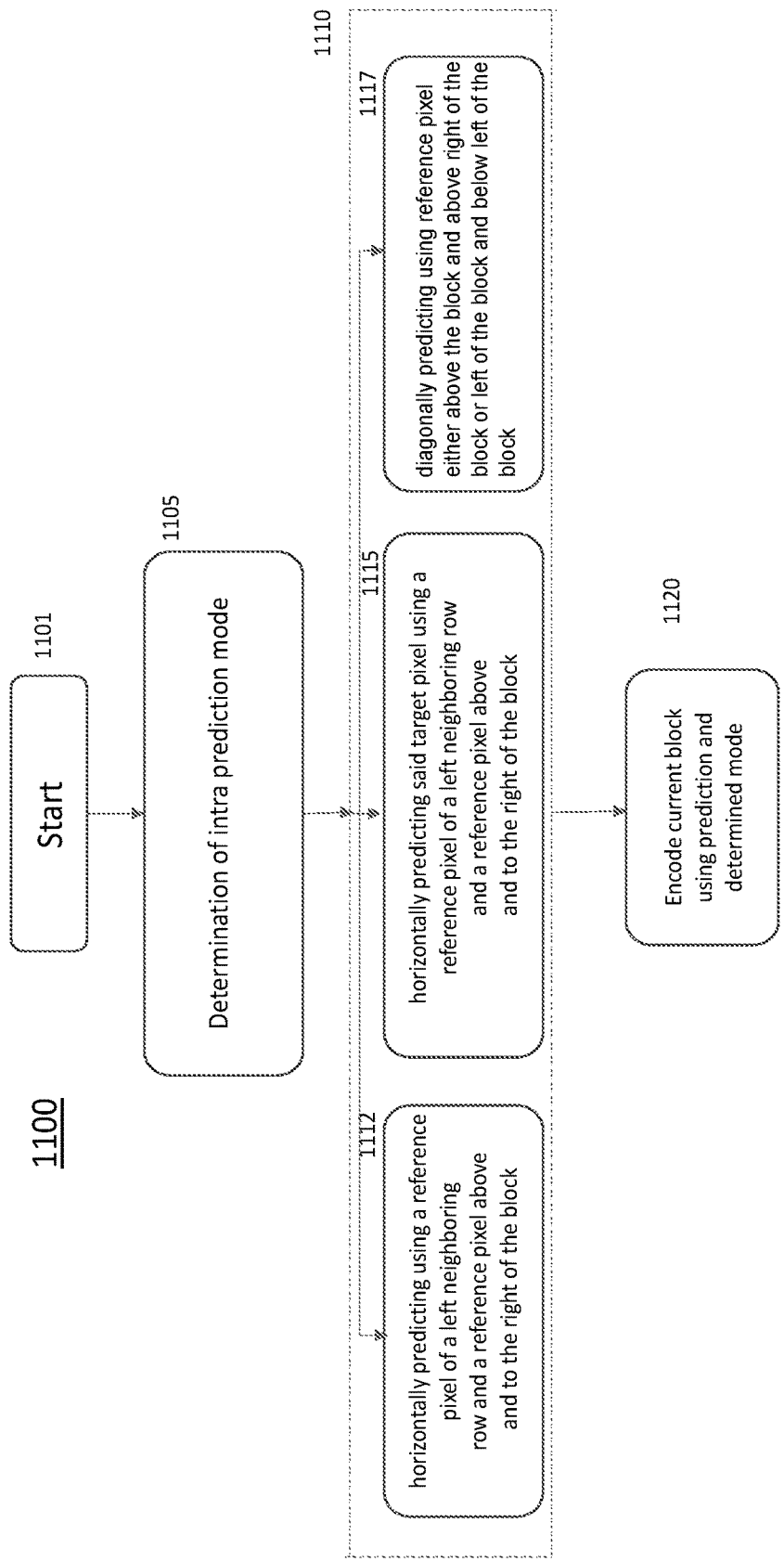
FIG. 11 shows one embodiment of a decoding method under the general aspects described.

One embodiment of a method 1100 for decoding a block of video data using the general aspects described here is shown in FIG. 11. The method commences at Start block 1101 and control proceeds to function block 1105 for determining an extended intra prediction mode to be used to decode a block of video data. Control then proceeds from block 1105 to block 1110 for predicting target pixels of the block of video data using the determined extended intra prediction mode. Depending on the determined extended intra prediction mode, control proceeds to one of several predictions. If the determined extended prediction mode is a planar horizontal mode, control proceeds to function block 1112 for horizontally predicting the target pixel using a reference pixel of a left neighboring row and a reference pixel above and to the right of the block. Or, if the determined extended prediction mode is a planar vertical mode, control proceeds to function block 1115 for vertically predicting said target pixel using a reference pixel of an above neighboring row and a reference pixel left and below the block. Or, if the determined extended prediction mode is a planar diagonal mode, control proceeds to function block 1117 for diagonally predicting said target pixel using reference pixels either above the block and above right of the block or left of the block and below left of the block. Control proceeds from block 1110 to block 1120 for decoding the video block using said prediction in an extended intra coding mode.

Figure 12:
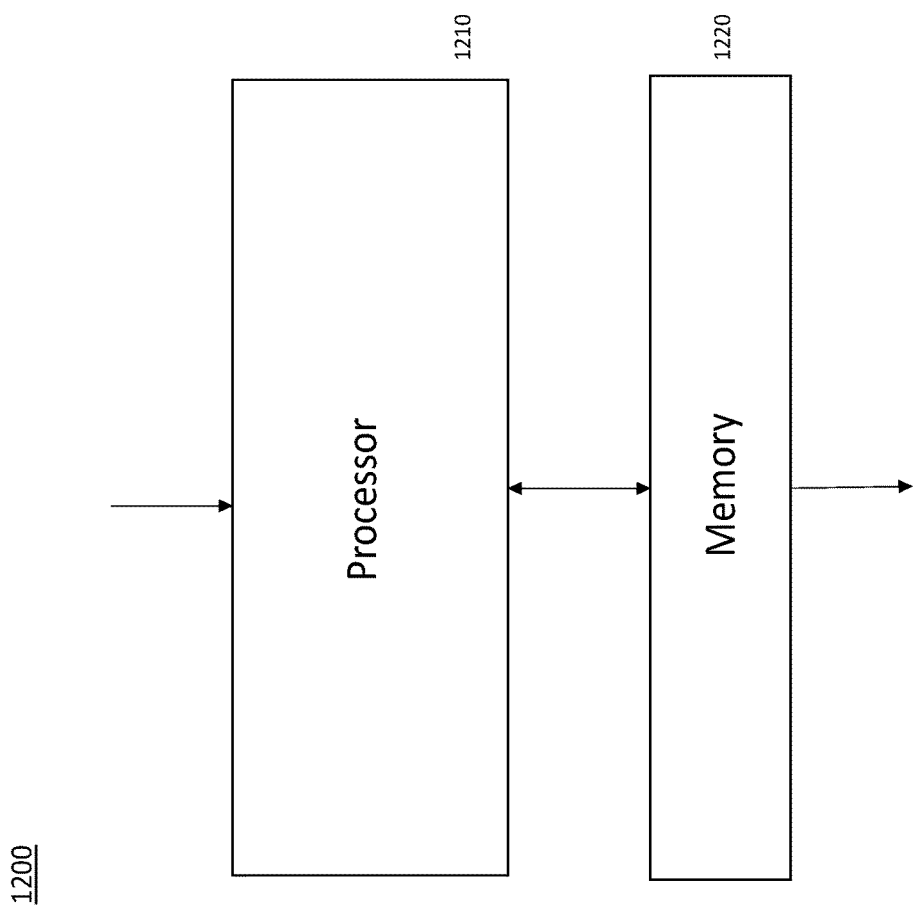
FIG. 12 shows one embodiment of an apparatus for encoding or decoding using intra prediction mode extensions.

FIG. 12 shows one embodiment of an apparatus 1200 for encoding or decoding a block of video data. The apparatus comprises Processor 1210 and can be interconnected to a memory 1220 through at least one port. Both Processor 1210 and memory 1220 can also have one or more additional interconnections to external connections.

Processor 1210 is configured to either encode or decode video data using an extended prediction mode and, either encoding or decoding the block of video data using the prediction in an extended intra coding mode.

The general aspects described aim to improve the intra prediction efficiency through the introduction of three new modes and the necessary changes required for the intra mode coding with the help of the MPM list. The advantage is the higher compression efficiency without much additional complexity.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 13:
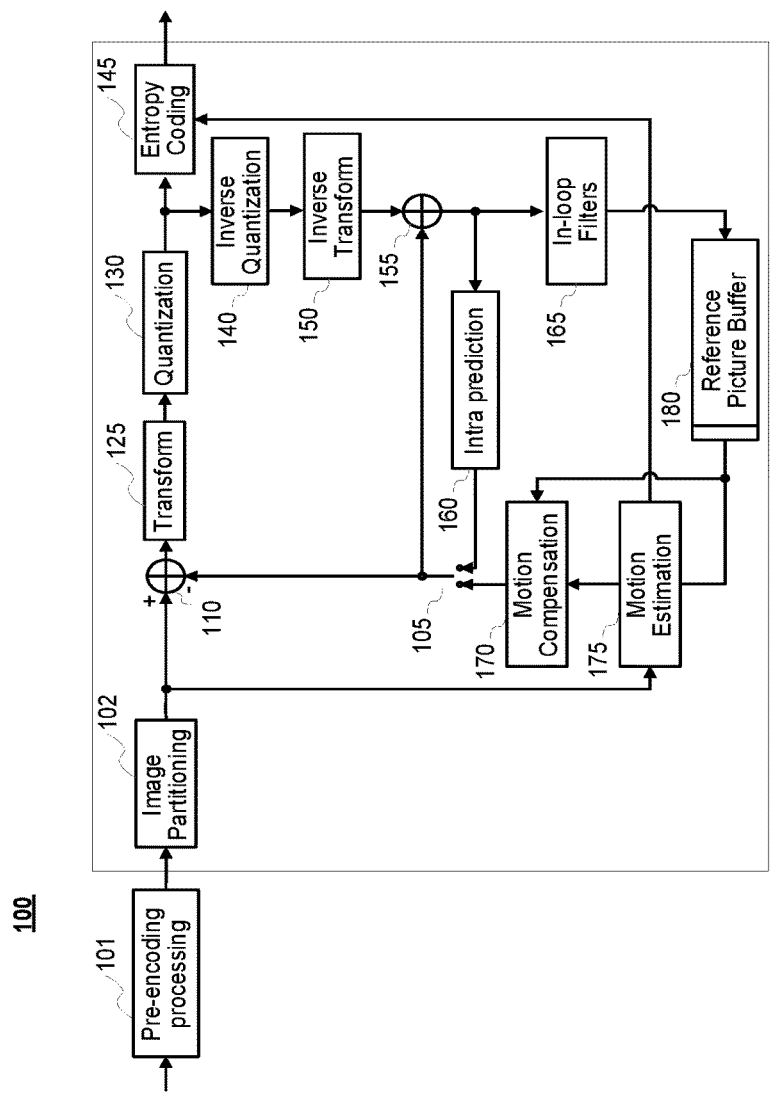
FIG. 13 shows a generic, standard encoding scheme.
Figure 14:
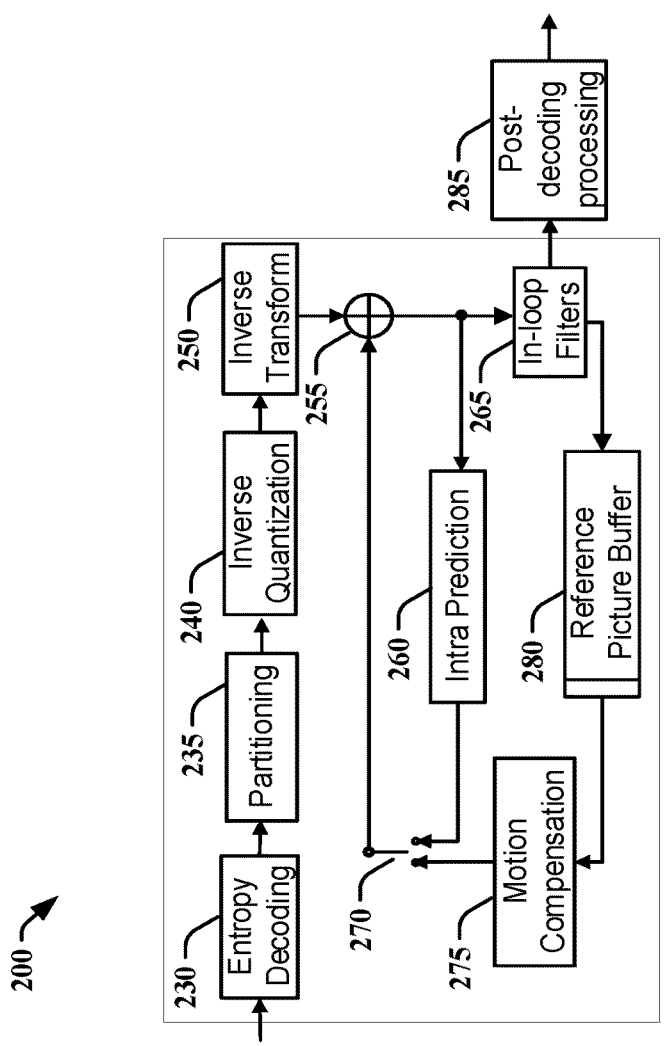
FIG. 14 shows a generic, standard decoding scheme.
Figure 15:
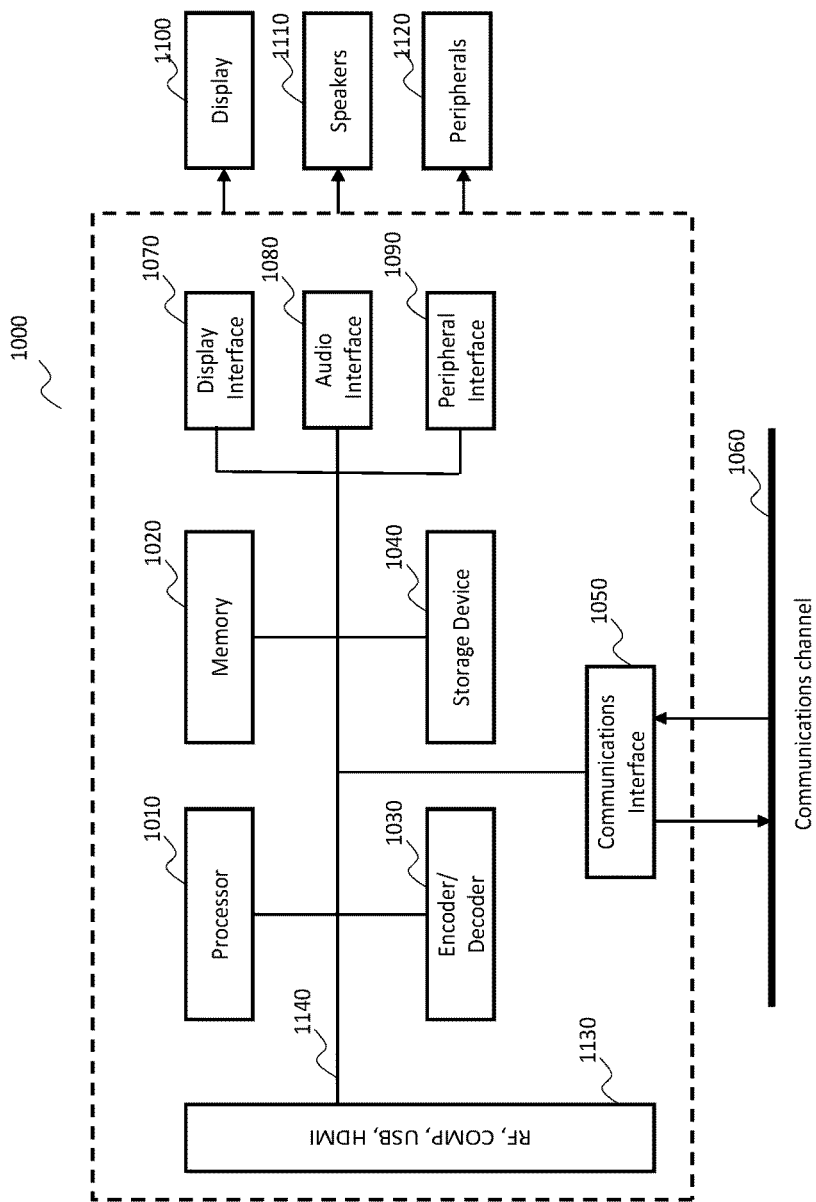
FIG. 15 shows a typical processor arrangement in which the described embodiments may be implemented.

The aspects described and contemplated in this application can be implemented in many different forms. FIGS. 13, 14, and 15 provide some embodiments, but other embodiments are contemplated and the discussion of FIGS. 13, 14, and 15 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 13 and FIG. 14. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 13 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 14 illustrates a block diagram of a video decoder 200. In the decoder 200, a bitstream is decoded by the decoder elements as described below. Video decoder 200 generally performs a decoding pass reciprocal to the encoding pass as described in FIG. 13. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 15 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 15, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (12C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to perform intra encoding and decoding with mode extensions.

A process or device to perform intra encoding and decoding with mode extensions using multiple reference lines.

A process or device to perform intra encoding and decoding with mode extensions using an MPM (Most Probable Mode) list and variable length codes to indicate which mode is used.

A process or device to perform intra encoding and decoding with mode extensions and filtering of predicted pixels across block boundaries.

A process or device to perform intra encoding and decoding with mode extensions on rectangular blocks.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   determining an extended intra prediction mode to be used to encode a block of video data;
   predicting a target pixel of the block of video data as a function of one or more pixels neighboring the block using said determined extended intra prediction mode, wherein said predicting comprises:
   horizontally predicting said target pixel using a reference pixel of a left neighboring row and a reference pixel above and to the right of the block, or
   vertically predicting said target pixel using a reference pixel of an above neighboring row and a reference pixel left and below the block,
   modifying a most probable mode list depending on whether prediction modes of left and top neighbor blocks are directional or non-directional modes or whether said left and top neighbor blocks use and extended prediction mode; and,
   encoding the block of video of video data using the prediction.

2. The method of claim 1, wherein said reference pixels are reconstructed pixels or estimated pixels.

3. A non-transitory computer readable medium containing data content generated according to the method of claim 1, for playback using a processor.

4. An apparatus, comprising:
   a processor, configured to perform:
   determining an extended intra prediction mode to be used to encode a block of video data;
   predicting a target pixel of the block of video data as a function of one or more pixels neighboring the block using said determined extended intra prediction mode, wherein said predicting comprises:
   horizontally predicting said target pixel using a reference pixel of a left neighboring row and a reference pixel above and to the right of the block, or
   vertically predicting said target pixel using a reference pixel of an above neighboring row and a reference pixel left and below the block,
   modifying a most probable mode list depending on whether prediction modes of left and top neighbor blocks are directional or non-directional modes or whether said left and top neighbor blocks use and extended prediction mode; and
   encoding the block of video of video data using the prediction.

5. A method, comprising:
   determining an extended intra prediction mode to be used to decode a block of video data;
   predicting a target pixel of the block of video data as a function of one or more pixels neighboring the block using said determined extended intra prediction mode, wherein said predicting comprises:
   horizontally predicting said target pixel using a reference pixel of a left neighboring row and a reference pixel above and to the right of the block, or
   vertically predicting said target pixel using a reference pixel of an above neighboring row and a reference pixel left and below the block, modifying a most probable mode list depending on whether prediction modes of left and top neighbor blocks are directional or non-directional modes or whether said left and top neighbor blocks use and extended prediction mode; and, decoding the block of video of video data using the prediction.

6. The method of claim 5, wherein at least one of said horizontal prediction, said vertical prediction and said diagonal prediction are assigned indices corresponding to their modes.

7. The method of claim 6, wherein a flag is used, indicative of said prediction corresponding to a mode that is included in a most probable mode list.

8. The method of claim 5, wherein said predictions are made from reference pixels one or more pixels from the block.

9. The method of claim 8, wherein syntax indicates which references pixels are used for said predictions.

10. The method of claim 8, wherein said predictions are made from reference pixels one or more pixels from the block and wherein syntax indicates which references pixels are used for said predictions.

11. The method of claim 5, wherein a prediction is chosen based on a Rate Distortion optimization using a first reference line of pixels around the block.

12. The method of claim 5, wherein a filtering of predicted pixels is performed across the boundary of the block depending on the prediction used.

13. A computer program product comprising instructions which, when the program is executed by a computer, cause the computer to carry out the method of claim 5.

14. An apparatus, comprising:
a processor, configured to perform:
determining an extended intra prediction mode to be used to decode a block of video data;
predicting a target pixel of the block of video data as a function of one or more pixels neighboring the block using said determined extended intra prediction mode, wherein said predicting comprises:

horizontally predicting said target pixel using a reference pixel of a left neighboring row and a reference pixel above and to the right of the block, or vertically predicting said target pixel using a reference pixel of an above neighboring row and a reference pixel left and below the block, modifying a most probable mode list depending on whether prediction modes of left and top neighbor blocks are directional or non-directional modes or whether said left and top neighbor blocks use and extended prediction mode; and decoding the block of video of video data using the prediction.

15. A device comprising:
an apparatus according to claim 14; and
at least one of (i) an antenna configured to receive a signal, the signal including the video block, (ii) a band limiter configured to limit the received signal to a band of frequencies that includes the video block, and (iii) a display configured to display an output representative of a video block.

16. The apparatus of claim 14, wherein said reference pixels are reconstructed pixels or estimated pixels.

17. The apparatus of claim 14, wherein at least one of said horizontal prediction, said vertical prediction and a diagonal prediction are assigned indices corresponding to their modes.

18. The apparatus of claim 14, wherein at least one of said horizontal prediction, said vertical prediction and a diagonal prediction are assigned indices corresponding to their modes and wherein a flag is used, indicative of said prediction corresponding to a mode that is included in a most probable mode list.

19. The apparatus of claim 14, wherein said predictions are made from reference pixels one or more pixels from the block.

20. The apparatus of claim 14, wherein a filtering of predicted pixels is performed across the boundary of the block depending on the prediction used.

* * * * *